Patented Apr. 18, 1933

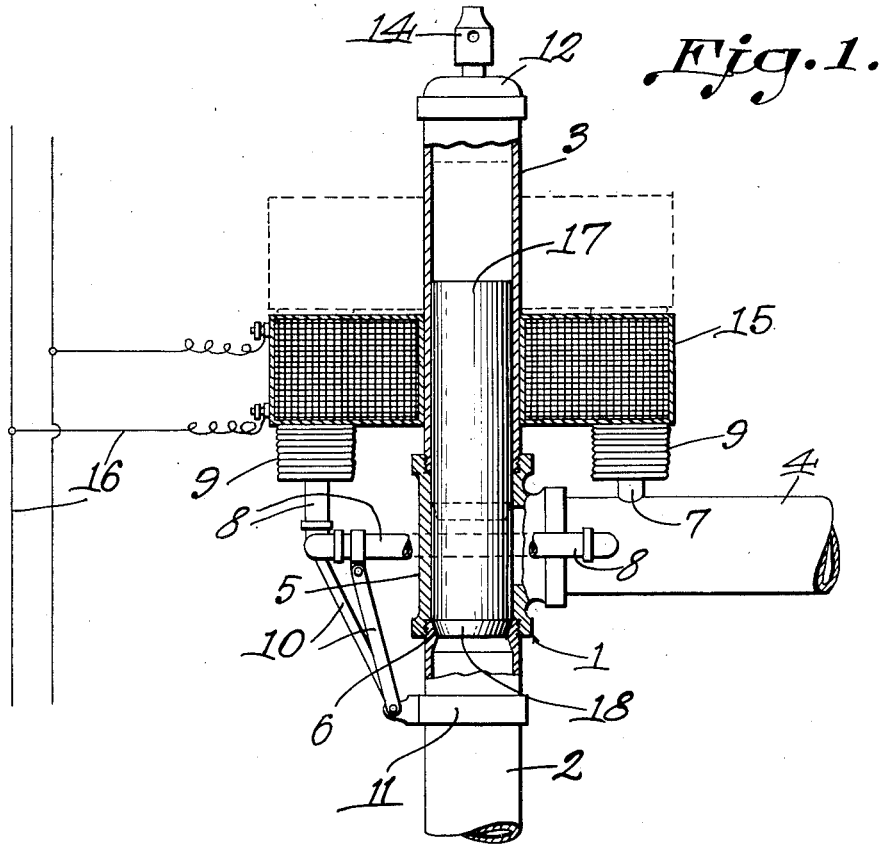
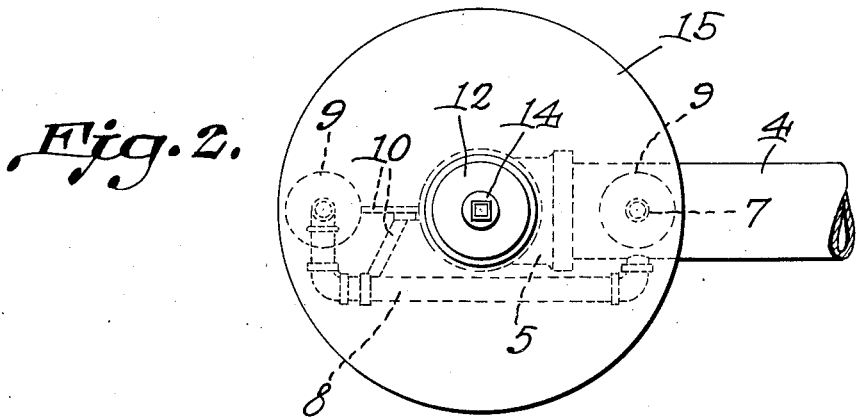

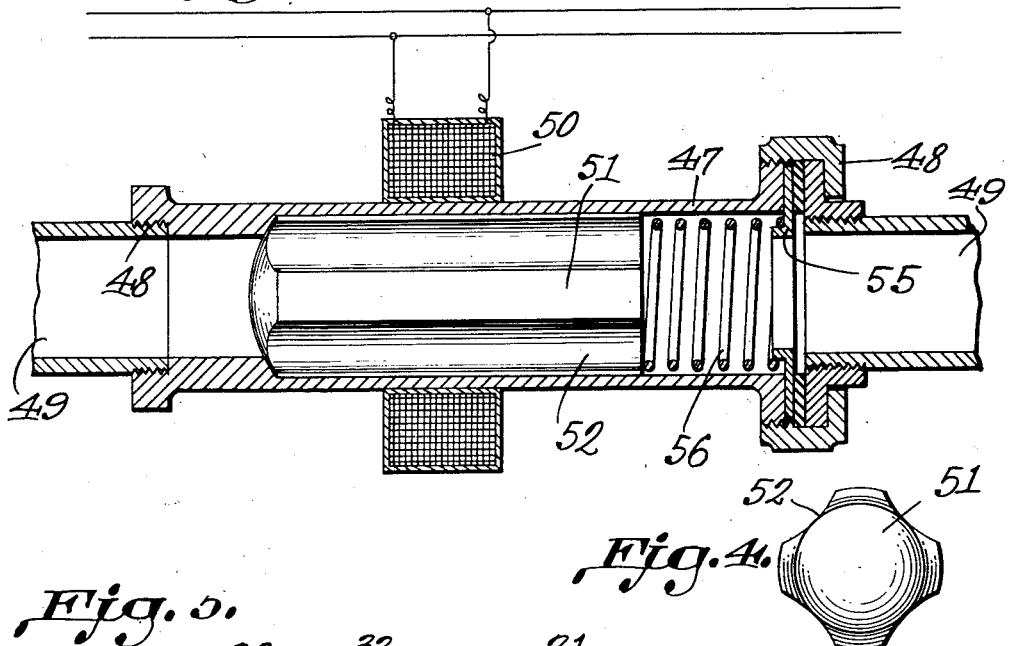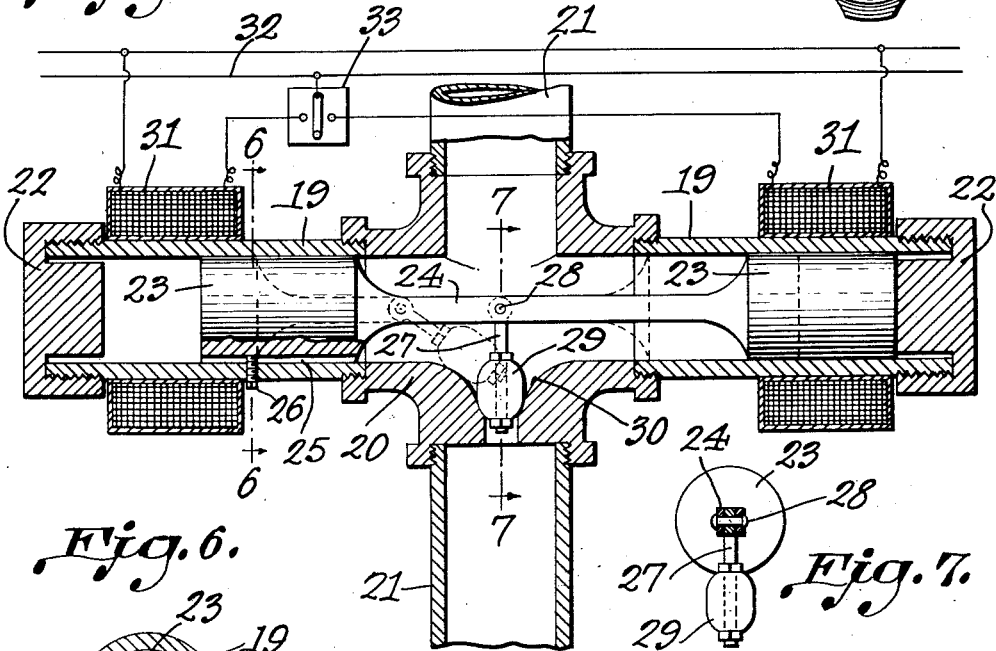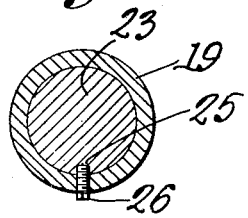

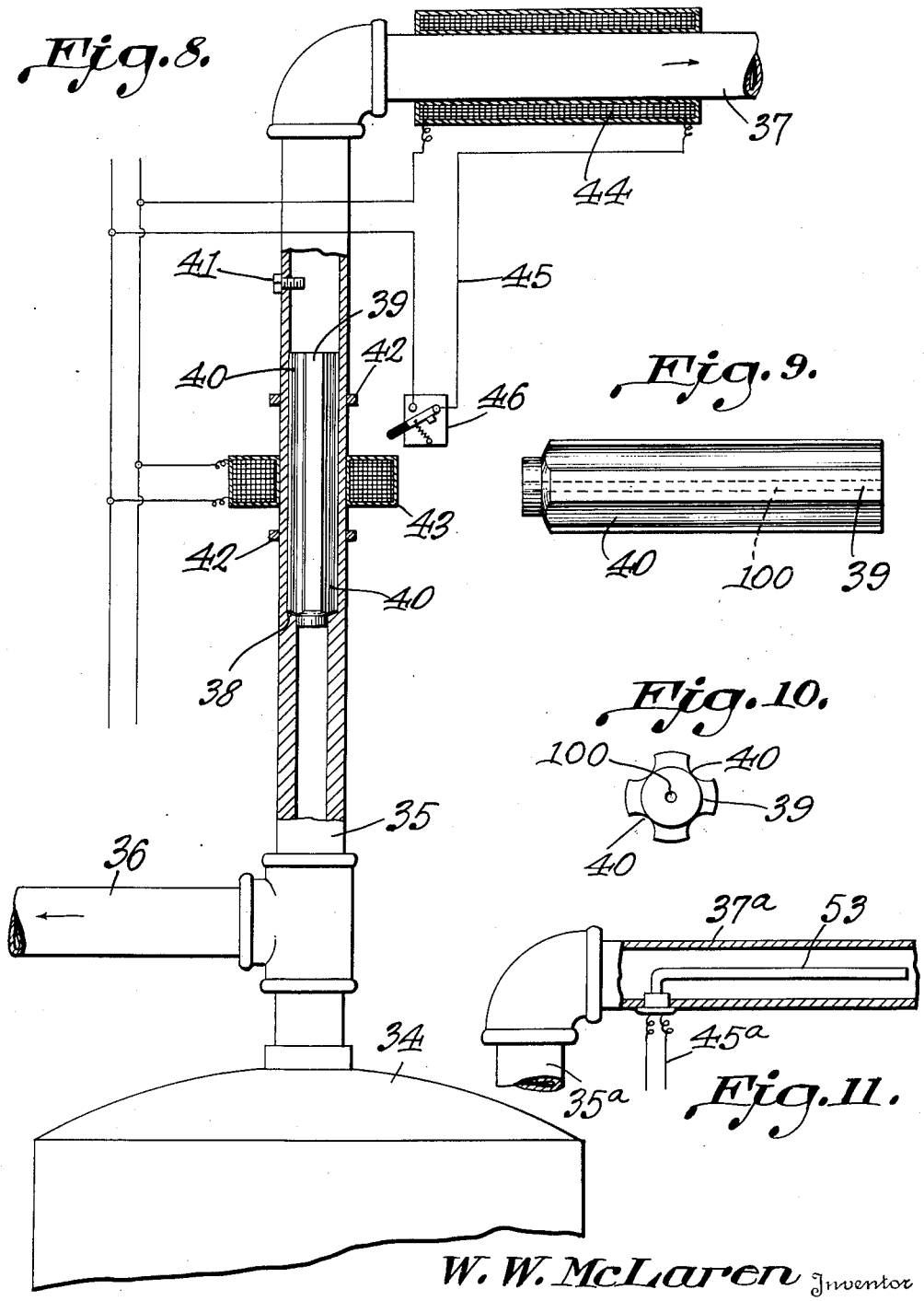

1,903,902

UNITED STATES PATENT OFFICE

WILLIAM W. McLAREN, OF BIRMINGHAM, ALABAMA

MAGNETIC VALVE

Application filed May 7, 1930. Serial No. 450,578.

This invention aims to provide a novel means whereby a valve may be operated by a magnet, such as a solenoid coil, it being unnecessary to have openings for valve stems and the like, and leakage being avoided accordingly.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:—

Figure 1 shows in vertical section, a device constructed in accordance with the invention, parts being in elevation;

Figure 2 is a top plan of the structure shown in Figure 1;

Figure 3 is a section showing a modification;

Figure 4 is an end elevation of the valve or armature employed in Figure 3;

Figure 5 is a sectional view illustrating a modified form of the invention;

Figure 6 is a cross section on the line 6—6 of Figure 5;

Figure 7 is a cross section on the line 7—7 of Figure 5;

Figure 8 is an elevation showing a further modification, parts being in section;

Figure 9 is an elevation of the valve or armature employed in Figure 8;

Figure 10 is an end elevation of the member delineated in Figure 9;

Figure 11 is a sectional view disclosing a modified heater.

Referring particularly to Figures 1 and 2, there is shown a conduit 1 including pipes 2 and 3 arranged in coaxial relation, a pipe 4 being disposed at right angles to the pipes 3 and 2. The pipes 2, 3, and 4 are connected by a T-coupling 5. The pipes 2 and 3 and the coupling 5 are made out of non-magnetic material. There is a seat 6 in the upper end of the pipe 2. The pipe 4 has branches 7 and 8 which terminate at right angles to the axis of the pipe 4. The branches 7 and 8 carry expansible members 9, which may open and close like an accordion. The branch 8 is sustained by braces 10 connected to a collar 11 on the pipe 2. On the upper end of the pipe 3 there is a cap 12 carrying a valve 14 which automatically lets off pressure in the upper end of the pipe 3.

A solenoid 15 is supported on the expansible members 9 and is mounted for reciprocation on the pipe 3. The numeral 16 marks the circuit whereby electric current is supplied to the solenoid 15. An armature or valve 17 is mounted to reciprocate in the pipe 3 and in the T-coupling 6. The valve 17 is shaped, as shown at 18, at its lower end, so as to cooperate with the seat 6. The armature or valve 17 is made out of magnetizable material, and, therefore, is responsive to the solenoid 15.

When pressure in the pipe 4 builds up, the pressure is transmitted by the branches 7 and 8 to the members 9. The members 9 expand, raising the solenoid 15, and the armature valve 17 rises also, because it is responsive to the solenoid 15. The armature valve, thus, is spaced from the seat 6, and the fluid in the pipe 4 can flow into the pipe 2 until the pressure falls to a point where the members 9 contract, and, then, the solenoid 15 and the armature valve 17 will move downwardly, the armature valve closing on the seat 6.

In the form shown in Figures 5, 6, and 7, there is provided a conduit including pipes 21 connected to a cross coupling 20 forming part of a valve casing, the valve casing comprising tubes 19 arranged in coaxial relation, at right angles to the pipes 21, the tubes 19 being assembled with the couplings 20. The couplings 20 and the tubes 19 are made of non-magnetizable material, and the same observation holds true to caps 22 which are threaded on the outer ends of the tubes 19, or mounted otherwise thereon.

A plunger is mounted for right line reciprocation in the valve casing, and comprises heads 23 connected by a reduced stem 24. The plunger is made of magnetizable metal, and the heads 23 are responsive to solenoids 31. The circuit of the solenoids 31 is marked by the number 32, and in it is located a switch 33.

One of the heads 23 of the plunger has a longitudinal guide groove 25 cooperating with a projection 26 (such as a screw) mounted in one of the tubes 19. The plunger, consequently, is prevented from rotating on its axis, and, thus, a valve 29 is so positioned that it will cooperate with a seat 30 in the coupling 20, the valve being mounted on a hanger 27 pivoted at 28 to the stem 24 of the plunger.

By means of the switch 33, either of the solenoids 31 may be energized, and the plunger 24—23 will be moved to the left or to the right, depending upon which of the solenoids is energized. When the plunger 23—24 moves to the left in Figure 5, the valve 29 is carried to an open position with respect to the seat 30, and fluid can pass from one of the pipes 21 to the other, by way of the coupling 30. When the right hand coil 21 is energized, the plunger 23—24 will move to the right, and the hanger 27 will be carried into a vertical position, the valve 29 being engaged both forcibly and hermetically with the seat 30.

In Figure 8, the numeral 34 designates a hot water tank, to which is connected a pipe 35 made of non-magnetic material. The pipe 35 may have any desired number of branches 36—37. The pipe 35 is provided with an internal seat 38. A valve or armature 39 is mounted for right-line reciprocation in the pipe 35 and is adapted to cooperate with the seat 38. The valve or armature 39 has external passages 40, in the form of grooves. The valve or armature 39 is made of some metal that can be attracted by a solenoid. The upward movement of the member 39 is limited by a screw 41 or other projection in the pipe 35.

The pipe 35 has external stops 42 between which moves a solenoid 43, in the form of a ring coil slidable on the pipe 35. A heater 44, which may be a resistance coil, is disposed about the branch 37 of the pipe 35. The circuit for the heater 44 and the solenoid 43 is designated by the numeral 45, and in that circuit is located a switch 46 adapted to be operated by the solenoid 43, as the solenoid moves upwardly.

In practical operation, when water is caused to flow through the branch 37, by the opening of the faucet (not shown) or otherwise, the armature 39 moves upwardly, responsive to the flowing liquid, the liquid traversing the passage 40. When the armature 39 moves upwardly, the solenoid 43 moves along with it, current being supplied to the solenoid 43 independently of the heater 44. When the armature 39 rises, it closes the switch 46, and the heater 44 is put into operation, the water being heated so long as it is running through the branch 37. When, however, the water ceases to flow through the branch 37, the armature 39 moves downwardly upon the seat or stop 38, carrying with it the solenoid 43, the switch 46 moving to an open position and the heater 44 being put out of operation.

In Figure 8, the armature 39 is shown as mounted for vertical movement, but it may move horizontally, as shown in Figure 3. In that figure, the pipe 47 corresponds to the pipe 35 and is coupled at 48 to pipe sections 49. The solenoid is shown at 50, and the armature at 51, the armature having external passages 52 corresponding to the passages 40 in the armature 39. The coupling 48 holds a washer 55 with a collar, the washer 55 serving as an abutment for a compression spring 56 which abuts against the armature 51 and serves to push the armature to a closed position when the armature no longer is subjected to pressure which tends to keep it in open position, spaced from the seat with which it is shown engaged in Figure 3.

In Figure 11, parts shown in Figure 8 have been designated by numeral previously used, with the suffix "a". This view shows that an internal heater 53 may be used in connection with the branch 37a, rather than the external heater 44 of Figure 8.

Reverting to the form shown in Figures 9 and 10, the armature 39 is shown as having an axial opening 100 through it, from end to end. It will be understood that either the opening 100 or the external passages 40 may be employed, one to the exclusion of the other, as the operator may require, and that the external passages 40 may be of any desired configuration or shape.

Having thus described the invention, what is claimed is:—

1. In a device of the class described, a conduit, a movable magnet located outside of the conduit, and movable longitudinally of the conduit and a valve movable within the conduit longitudinally of the conduit and controlling the flow of fluid therethrough, the valve being free of mechanical connection with the magnet, but being continuously attracted by the magnet, whereby when the magnet is moved longitudinally of the conduit, the valve will be moved longitudinally of the conduit also, to control the flow of fluid through the conduit.

2. The device of claim 1, in combination with fluid-pressure-actuated mechanism for moving the magnet for the purpose specified and means for communicating pressure to said mechanism independently of the valve.

3. The device of claim 1, in combination with a heater for a part of the conduit, and means for starting and stopping the heater, said means being engageable by the magnet, whereby the magnet will operate the heater while the magnet is operating the valve.

In testimony that I claim the foregoing as my own, I have hereto affixed my signature.

WILLIAM W. McLAREN.